United States Patent [19]
Sowig

[11] Patent Number: 5,347,319
[45] Date of Patent: Sep. 13, 1994

[54] CIRCUIT FOR REGULATING THE COLOR SUBCARRIER AMPLITUDE IN A VIDEO RECORDER

[75] Inventor: Helmut Sowig, Villingen, Fed. Rep. of Germany

[73] Assignee: Deutsche Thomson-Brandt GmbH, Villingen, Fed. Rep. of Germany

[21] Appl. No.: 4,046

[22] Filed: Jan. 15, 1993

[30] Foreign Application Priority Data

Jan. 22, 1992 [DE] Fed. Rep. of Germany ....... 4201564

[51] Int. Cl.$^5$ .............................................. H04N 9/78
[52] U.S. Cl. .................................... 348/645; 348/647; 358/316; 358/327
[58] Field of Search ................ 358/27, 315, 316, 320, 358/326, 328, 21 R, 24, 25; H04N 9/64, 9/491, 9/78, 5/68, 9/80, 5/05

[56] References Cited

U.S. PATENT DOCUMENTS

| | | | |
|---|---|---|---|
| 3,806,635 | 4/1974 | Abbott et al. .......................... | 358/25 |
| 4,148,058 | 4/1979 | Harwood et al. ...................... | 358/24 |
| 4,417,284 | 11/1983 | Sato ..................................... | 358/316 |
| 4,485,396 | 11/1984 | Sandberg ............................. | 358/316 |

FOREIGN PATENT DOCUMENTS

| | | | |
|---|---|---|---|
| 1944378 | 9/1969 | Fed. Rep. of Germany .......... | H04N 5/78 |
| 2427591 | 6/1974 | Fed. Rep. of Germany .......... | H04N 5/795 |
| 2515219 | 4/1975 | Fed. Rep. of Germany . | |
| 3027914 | 7/1980 | Fed. Rep. of Germany .......... | H04N 9/491 |
| 3438564 | 10/1984 | Fed. Rep. of Germany .......... | G05B 11/26 |
| 3715913 | 5/1987 | Fed. Rep. of Germany .......... | H04N 5/05 |
| 4015403 | 5/1990 | Fed. Rep. of Germany .......... | H04N 9/68 |

Primary Examiner—James J. Groody
Assistant Examiner—Glenton B. Burgess
Attorney, Agent, or Firm—Joseph S. Tripoli; Dennis H. Irlbeck; Sammy S. Henig

[57] ABSTRACT

A circuit for regulating the color subcarrier amplitude in a video recorder used with a television receiver which employs overscanning of the electron beams for different modes of operation includes a regulating circuit for providing a regulating voltage representative of the amplitude of the color subcarrier. The regulating circuit includes a variable time constant circuit for switching from a short time constant during the overscanning to a long time constant immediately prior to ending the overscanning to change the regulating voltage in response to changes in the time constant. A variable amplifier is responsive to the regulating voltage to regulate the amplification of the color subcarrier in response to changes in the time constant.

8 Claims, 2 Drawing Sheets

//CIRCUIT FOR REGULATING THE COLOR SUBCARRIER AMPLITUDE IN A VIDEO RECORDER

BACKGROUND OF THE INVENTION

A video recorder, like a television receiver, is provided with a so-called ACC (automatic color control) circuit. The ACC circuit regulates the amplitude of the color subcarrier received from the tape to a desired value by evaluating of the amplitude of the color sync signal. On playback, there are two conflicting demands relating to the time constant of the ACC regulation circuit. The comb filter used to eliminate color crosstalk has a finite filtering depth and operates with a delay of one line time with NTSC or two line times with PAL. Prerequisite for a good filtering effect is that the color subcarrier on playback is fed to the comb filter unalienated, i.e. with the phase and amplitude errors caused by the crosstalk. The consequence of this is that the color subcarrier must be deviation controlled (stabilized), during one or two lines, only to such a small extent that no material impairment of the crosstalk attenuation occurs. When the regulation occurs too rapidly horizontally sorted noise appears in the color. This consideration suggests a long time constant for the ACC circuit. On the other hand, the regulation must be so fast that level differences of the video heads, which become relevant after the head change-over as well as level break-downs, caused guiding of the tape, in the head cylinder run-in during the vertical blanking interval and the following picture overscanning are stabilized. If the regulation is too slow then color flicker appears at the upper picture edge. This consideration suggests a short time constant for the ACC circuit.

When selecting the time constant the first consideration is usually deemed the most important. This is so because additional noise would be very disturbing in view of the color quality being reduced by making the color recording. Also, level differences can be kept relatively small by using paired video heads, and level break-downs in the head cylinder run-in are small when the tape is carefully guided. Also, the ACC further reduces level differences which can not be adjusted in the television apparatus. The copying from one video recorder to another is particularly critical as regards color flicker.

It is an object of this invention to avoid the above-named disadvantages and to stabilize the color subcarrier amplitude after head change-over and also during picture scanning. With the invention, slower regulation, i.e. a large time constant is chosen or, in the case of an ACC with constant current, a small charging current is used Prior to the start of the picture or just after the head change-over pulse, that is during the period in which the electron beam is visible on the picture screen owing to flyback or overscanning, a switch-over to a quicker regulation, i.e. a smaller time constant or higher charging current is made.

This is possible because of the fact that at the start of a picture during approximately the first 20 lines no visible portion of the screen is scanned and, therefore color flicker and transient phenomena remain invisible during the time the time constant is changed. With the invention after the scanned color subcarrier has gone through the phase shift caused by the head change-over and the amplitude break-down, the color subcarrier is stabilized to its desired amplitude using a short time constant for the adjustment. The amplitude of the color subcarrier therefore will have reached its desired value before the beginning of the visible picture, approximately at line No. 20. The time constant is increased before the first visible line is scanned. Thus, the invention attains an optimum compromise between a large time constant, which is advantageous and necessary for picture reproduction without horizontal noise, and a small time constant, which is advantageous for quick stabilization after head changeover. When applying the invention, the large time constant during the picture can even be increased compared to prior values resulting in advantages with respect to horizontal noise without color flicker appearing at the upper visible picture edge.

SUMMARY OF THE INVENTION

A circuit for regulating the amplitude of a color subcarrier includes an arrangement for providing a regulation voltage representative of the amplitude of the color subcarrier. The arrangement includes variable time constant arrangement for switching from a short time constant, during an overscanning period of a television signal to a long time constant immediately prior to the end of the overscanning period so as to change the regulating voltage. A variable amplifier regulates the amplitude of the color subcarrier in response to the time constant changes.

BRIEF DESCRIPTION OF THE DRAWING

The invention is described with reference to the drawings, in which.

DESCRIPTION OF THE PREFERRED EMBODIMENT

Figure 1:
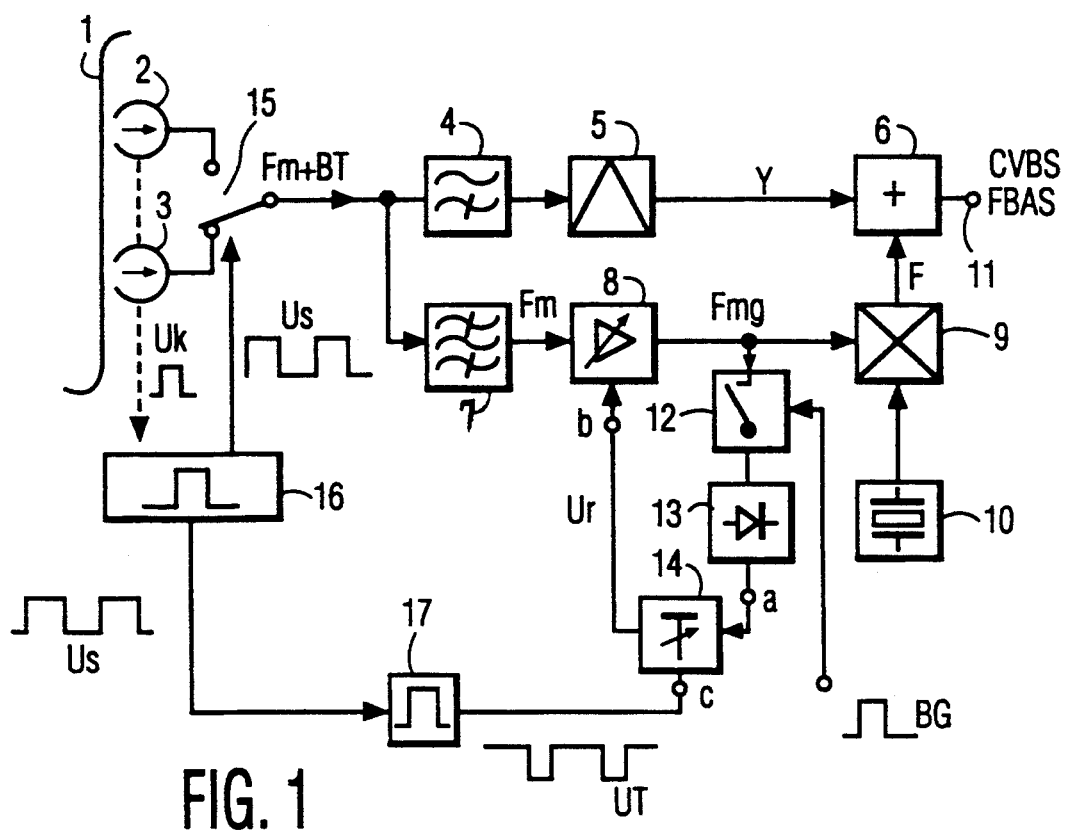
FIG. 1 is a block diagram of a preferred embodiment of a playback circuit for a video recorder.

In FIG. 1 the video carrier BT frequency modulated with the luminance signal and the color subcarrier Fm recorded below the frequency spectrum of the video carrier and lower in frequency, also referred to as color under carrier, are scanned from the magnetic tape 1 by means of two rotating magnetic heads 2 and 3. The video carrier BT is fed via a high pass filter 4 with a limit frequency of 1.2 MHz to an FM demodulator 5, which supplies the luminance signal Y to an adding stage 6. The color subcarrier Fm is fed via a band pass filter 7, with a pass range at 627 kHz, to an adjustable amplifier 8 and from the output of the amplifier 8 is fed, as a regulated color subcarrier Fmg, to a mixing stage 9, which is also fed with a mix carrier from an oscillator 10. The mixer stage 9 supplies the color subcarrier F (for example, the original PAL color subcarrier frequency of 4.43 MHz) to the adding stage 6. Therefore, the color signal is available at the output terminal 11. The color sync signal is evaluated from the color subcarrier Fmg at the output of amplifier 8 using the gate 12. Gate 12 is controlled to be conductive by a burst gate pulse for the duration of the color sync signal. The color sync signal is rectified in the rectifier 13 and generates a regulating voltage Ur at the regulating input terminal b of amplifier 8. The regulating voltage Ur regulates the amplitude of the color subcarrier Fmg to the desired value. A time constant element having a large time constant of 50 to 70 lines, corresponding to about 4 ms, is effective between the output terminal of a rectifier 13 and the input terminal b of amplifier 8.

The signal is picked up using the change-over switch 15 alternating from field to field by the two video heads 2 and 3. The change-over switch 15 is actuated by means of the switching voltage Us at the end of each field. Voltage Us is generated in the control circuit 16. Control circuit 16 is controlled by a rotating head cylinder carrying the heads 2 and 3 by means of a head cylinder pulse Uk which indicates the respective angular position of the head cylinder. The circuit described so far is state-of-the-art.

Figure 2:
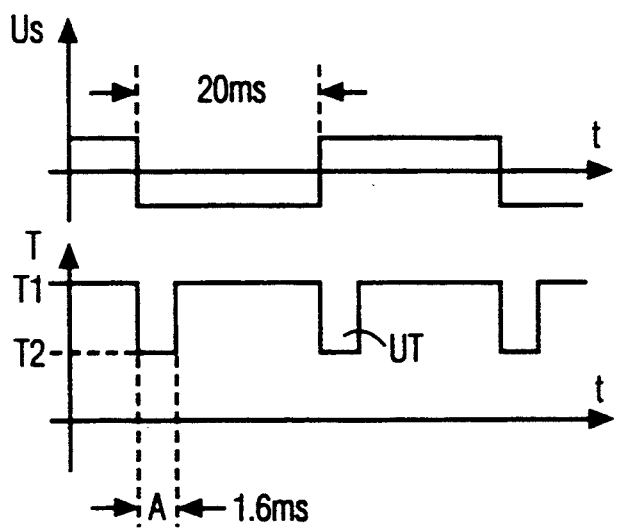
FIG. 2 shows curves illustrating the operation of the preferred embodiment shown in FIG. 1.

The switching voltage Us from control circuit 16 is also fed to the pulse former 17. As shown in, FIG. 2, pulse former 17 generates, at an edge of the switching voltage Us, i.e. at the start of a field, a pulse UT with a duration A of about 25 lines, corresponding to about 1.6 ms. This pulse is fed to a control input terminal c of the time constant element 14 and switches the time constant T from the high value T1 of about 4 ms, which is effective during the picture, to a smaller value T2 of about 1 ms during the time period A. The period A approximately corresponds to the period during which the electron beam is not visible owing to overscanning on the picture screen. The reduced time constant T2 serves to ascertain that the amplitude of the regulated color subcarrier Fmg, after the phase shift and amplitude break-down caused by the head change-over, again has its desired value at the start of the visible picture, i.e. at the end of the period A in FIG. 2. In this manner, color disturbance in the form of color flicker at the upper visible picture edge is avoided.

Figure 3:
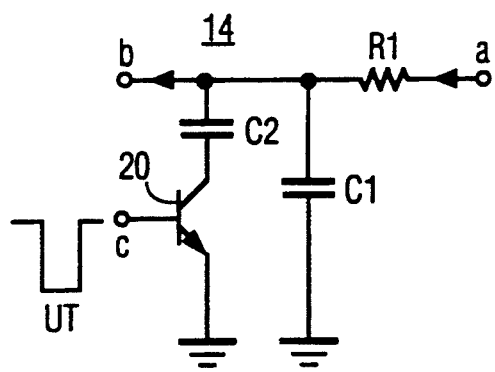
FIGS. 3 through 5 show preferred embodiments of circuits for the switching of the time constants.

FIG. 3 shows a circuit for switching-over the time constant T. The time constant element 14 contains a resistor R1 and two capacitors C1 and C2. During the actual picture the transistor 20 is controlled to be conductive by the voltage UT at the terminal c. Capacitors C1 and C2 are in parallel and form the longer time constant T1. During time period A transistor 20 is blocked by the switching voltage UT. Therefore, the capacitor C2 is not effective. C1 then forms, together with R1, the smaller time constant T2. Preferably, the switching voltage UT connects and disconnects a capacitor at a terminal of an integrated circuit representing the remainder of the circuit.

Figure 4:
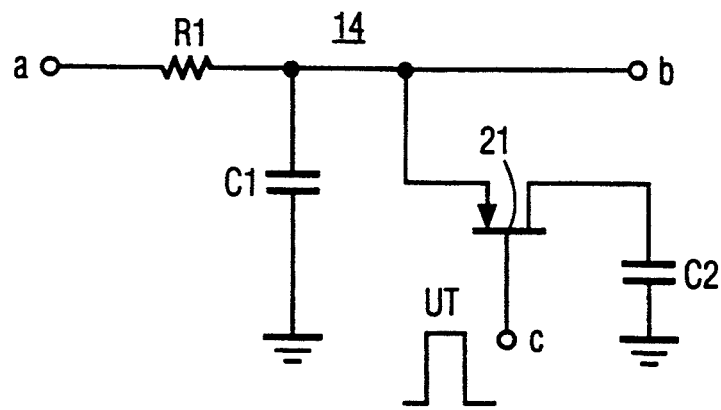

FIG. 4 shows a variation of a switching circuit in which the switching of the time constant, i.e. the connecting and disconnecting of capacitor C2 is accomplished using a field effect transistor 21. The switching voltage UT is applied to the control electrode of the field effect transistor 21. During the period A the FET 21 is blocked by the switching voltage UT, and it is conductive for the rest of the time, i.e. during the picture scanning, so that C2 is switched in parallel with C1 for achieving the longer time constant.

Figure 5:
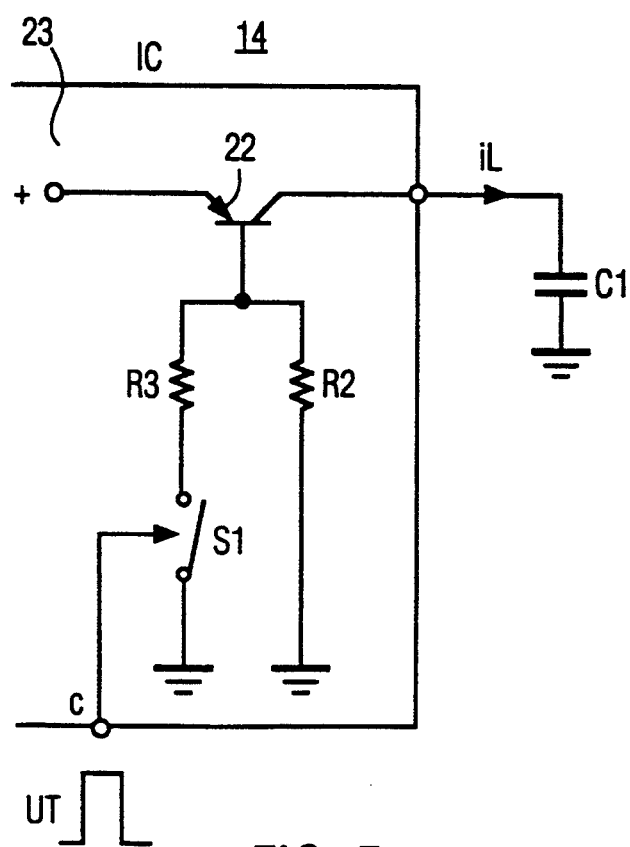

FIG. 5 shows a circuit for switching the time constant in which the charging current iL for the capacitor C1 is switched over. In an IC 23 a constant current source with the transistor 22 and the resistors R2 and R3 is provided which supplies a charging current iL for capacitor C1 for reverse charging in accordance with the respective actual regulation. The value of the charging current iL is switched over by the switching voltage UT in that resistor R3 is switched, via switch S1, parallel to resistor R2. For the period A the switch S1 is closed by UT so that the resistance in the base circuit is correspondingly reduced. Thereby, the value of the charging current iL is increased, i.e. C1 is reverse charged more quickly, corresponding to the reduced time constant T2. With this circuit switching of the time constant occurs, not by connecting or disconnecting a capacitor within a filter section, but rather, by changing the charging current iL for the filter capacitor C1, which otherwise has the same function as in FIGS. 3 and 4.

I claim:

1. A circuit for regulating the amplitude of a color subcarrier in a video recorder used with a television receiver which employs overscanning of electron beams, said circuit comprising:

means for receiving said color subcarrier and providing a regulating voltage representative of the amplitude of said color subcarrier, wherein said means for receiving includes variable time constant means for switching from a short time constant during an overscanning period of a television signal to a long time constant immediately prior to the end of said overscanning period so as to change said regulating voltage; and a variable amplifier responsive to said regulating voltage for regulating the amplitude of said color subcarrier in response to said time constant changes.

2. The circuit of claim 1 wherein said variable time constant means includes gate means for actuating said means for receiving during the presence of a color sync signal of said television receiver.

3. The circuit of claim 2 wherein said variable time constant means includes a RC network having parallel capacitors and a voltage responsive switch for switching one of said capacitors into and out of said variable time constant means.

4. The circuit of claim 3 wherein said voltage responsive switch is a transistor.

5. The circuit of claim 2 wherein said means for receiving includes a constant current source and a variable resistance for changing the output current of said constant current source.

6. The circuit of claim 5 wherein said variable resistance includes parallel resistors and a voltage responsive switch for switching one of said resistors into and out of said means for receiving.

7. The circuit of claim 6 wherein said voltage responsive switch is a transistor.

8. A method of regulating the amplitude of a color subcarrier in a video recorder for recording and playing various forms of television signals by using overscanning of the visible portion of a television signal comprising the steps of:

providing a first regulating voltage to adjust the amplitude of said color subcarrier to a value permitting rapid changes to said amplitude in response to head changes in said recorder by switching a regulation circuit to a first time constant during said overscanning; and providing a second regulating voltage to adjust the amplitude of said color subcarrier to a value which avoids flicker in the first visible line scanned in said visible portion by switching said regulation circuit to a second time constant, longer than said first time constant, before the first line of said visible portion of the television signal is scanned.

* * * * *